(12) United States Patent
Jung

(10) Patent No.: US 9,748,529 B2
(45) Date of Patent: Aug. 29, 2017

(54) RECHARGEABLE BATTERY HAVING A HEAT-RESISTANT MEMBER

(71) Applicant: Samsung SDI Co., Ltd., Yongin-si, Gyeonggi-do (KR)

(72) Inventor: Hyun-Ki Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 239 days.

(21) Appl. No.: 14/552,417

(22) Filed: Nov. 24, 2014

(65) Prior Publication Data

US 2015/0194644 A1 Jul. 9, 2015

(30) Foreign Application Priority Data

Jan. 7, 2014 (KR) ........................ 10-2014-0001925

(51) Int. Cl.
*H01M 2/02* (2006.01)
*H01M 2/04* (2006.01)
*H01M 2/08* (2006.01)
*H01M 2/12* (2006.01)
*H01M 2/34* (2006.01)

(52) U.S. Cl.
CPC ........... *H01M 2/0413* (2013.01); *H01M 2/08* (2013.01); *H01M 2/022* (2013.01); *H01M 2/1235* (2013.01); *H01M 2/345* (2013.01); *H01M 2200/10* (2013.01)

(58) Field of Classification Search
CPC .. H01M 2/0413; H01M 2/0408; H01M 2/345; H01M 2/08; H01M 2200/10; H01M 2/1235; H01M 2/022
See application file for complete search history.

(56) References Cited

U.S. PATENT DOCUMENTS

| 4,943,497 | A | * | 7/1990 | Oishi | H01M 2/34 429/53 |
| 5,851,693 | A | * | 12/1998 | Sano | H01M 2/027 204/252 |
| 6,255,016 | B1 | * | 7/2001 | Kim | H01M 2/08 429/174 |
| 2007/0154781 | A1 | * | 7/2007 | Choi | H01M 2/0413 429/53 |
| 2010/0273047 | A1 | * | 10/2010 | Kunoike | H01M 2/08 429/181 |
| 2015/0221902 | A1 | * | 8/2015 | Otake | H01M 2/08 429/94 |

FOREIGN PATENT DOCUMENTS

KR 1996-0036184 A 10/1996
KR 10-2011-0046803 A 5/2011

* cited by examiner

*Primary Examiner* — Milton I Cano
*Assistant Examiner* — Michael Dignan
(74) *Attorney, Agent, or Firm* — Lewis Roca Rothgerber Christie LLP

(57) ABSTRACT

A rechargeable battery including an electrode assembly including a positive electrode and a negative electrode, a case configured to encase the electrode assembly, a cap plate coupled to the case, a gasket between the case and cap plate and configured to insulate the case from the cap plate, and a heat-resistant member between an upper portion of the gasket and an outer surface of the cap plate and having a higher melting point than the gasket.

10 Claims, 5 Drawing Sheets

RECHARGEABLE BATTERY HAVING A HEAT-RESISTANT MEMBER

CROSS-REFERENCE TO RELATED APPLICATION

This application claims priority to and the benefit of Korean Patent Application No. 10-2014-0001925 filed in the Korean Intellectual Property Office on Jan. 7, 2014, the entire content of which is incorporated herein by reference.

BACKGROUND

1. Field

The described technology relates generally to a rechargeable battery. More particularly, the described technology relates to a rechargeable battery having a heat-resistant member.

2. Description of the Related Art

A rechargeable battery differs from a primary battery in that it can be repeatedly charged and discharged, while the latter is not designed to be recharged.

A low-capacity rechargeable battery is used in small portable electronic devices such as mobile phones, notebook computers, and camcorders, while a high-capacity rechargeable battery can be widely used as a power source for driving a motor of a hybrid vehicle, an electric vehicle, and the like.

The rechargeable battery may be used in small electronic devices as a single cell battery or in motor-driving power sources, etc., as a battery module in which a plurality of cells are electrically coupled.

Because a cap plate and a case in the rechargeable battery are insulated from each other through a gasket, if the temperature increases, the gasket may soften or melt and cause a short-circuit between the case and the cap plate.

The above information disclosed in this Background section is only for enhancement of understanding of the background of the described technology and therefore it may contain information that does not form the prior art that is known to a person of ordinary skill in the art.

SUMMARY

Aspects of embodiments of the present invention are directed toward a rechargeable battery for stably preventing a short circuit between a case and a cap plate.

According to an embodiment of the present invention, there is provided a rechargeable battery including: an electrode assembly including a positive electrode and a negative electrode; a case configured to encase the electrode assembly; a cap plate coupled to the case; a gasket between the case and cap plate and configured to insulate the case from the cap plate; and a heat-resistant member between an upper portion of the gasket and an outer surface of the cap plate and having a higher melting point than the gasket.

In an embodiment, the heat-resistant member has a ring shape.

In an embodiment, an inner side end of the heat-resistant member protrudes toward a center of the case further than an upper end portion of the case.

In an embodiment, a vent plate having a notch is under the cap plate and is configured to enclose an edge portion of the cap plate, and the heat-resistant member is between the vent plate and the gasket.

In an embodiment, an inner side end of the heat-resistant member protrudes toward a center of the case further than the vent plate.

In an embodiment, the heat-resistant member includes a material having an electrically insulating property.

In an embodiment, the heat-resistant member includes a polyimide resin.

In an embodiment, the heat-resistant member includes a reinforcing member and an insulating layer configured to enclose the reinforcing member, and wherein the reinforcing member has greater strength than the insulating layer.

In an embodiment, the reinforcing member includes a glass fiber fabric.

In an embodiment, the reinforcing member includes a metal.

In an embodiment, the heat-resistant member includes a reinforcing member and an insulating layer laminated on the reinforcing member, and wherein the reinforcing member has greater strength than the insulating layer.

In an embodiment, the heat-resistant member includes a film having an adhesive property such and is configured to attach to the case.

DETAILED DESCRIPTION

Figure 1:
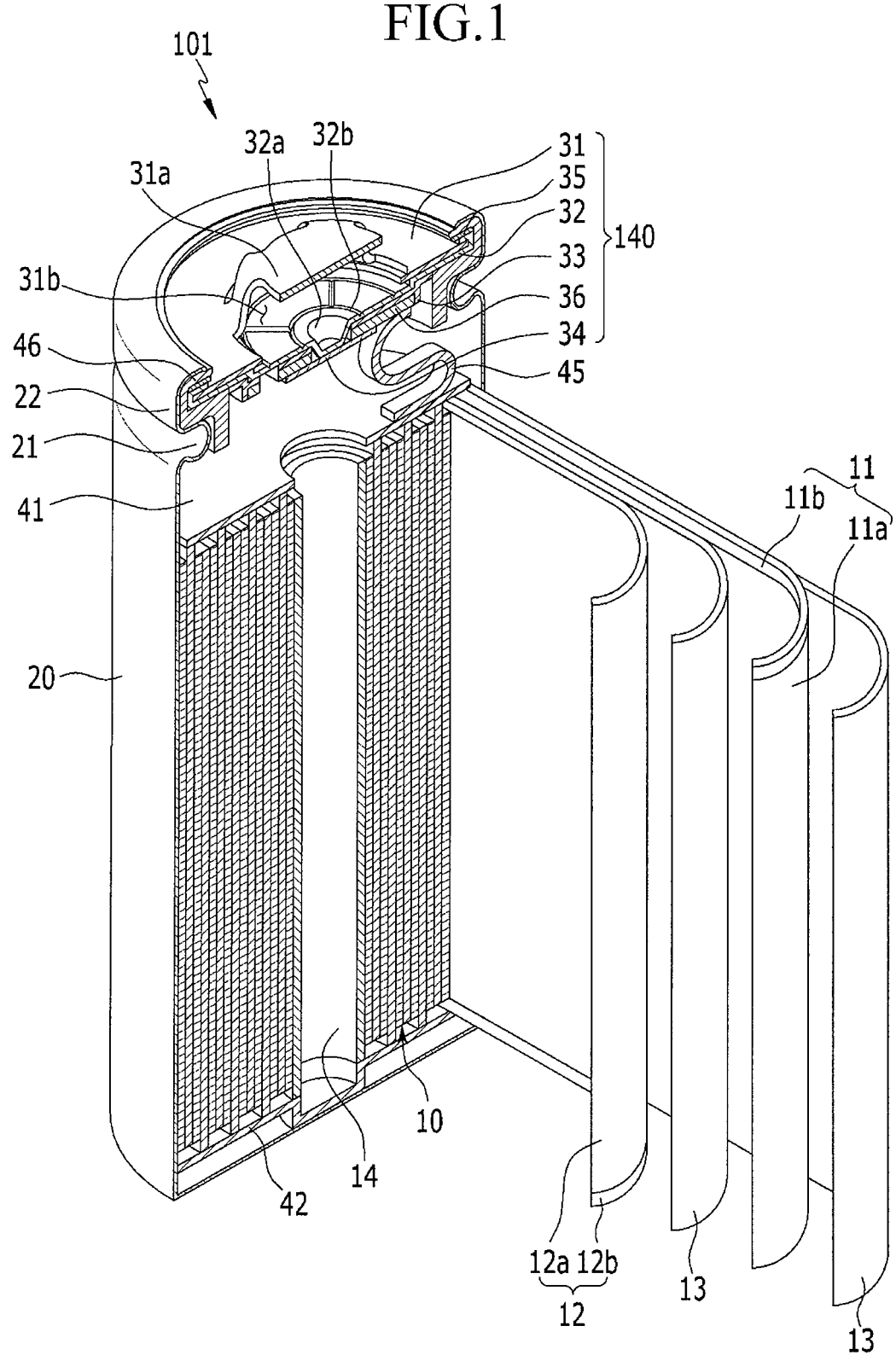
FIG. 1 is a cut-away perspective view of a rechargeable battery, according to a first example embodiment of the present invention.

The present invention will be described more fully hereinafter with reference to the accompanying drawings, in which example embodiments of the present invention are shown.

As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

FIG. 1 is a cut-away perspective view of a rechargeable battery, according to a first example embodiment of the present invention.

Referring to FIG. 1, the rechargeable battery 101, according to the first example embodiment of the present invention, includes an electrode assembly 10 for generating a current, a case 20 in which the electrode assembly 10 is placed, and a cap assembly 140 that is combined with (e.g., coupled to) the case 20 so as to be electrically coupled to (e.g., electrically connected to) the electrode assembly 10.

The electrode assembly 10 includes a positive electrode 11, a negative electrode 12, and a separator 13 interposed therebetween. The electrode assembly 10 is formed by spirally winding the positive electrode 11, the negative electrode 12, and the separator 13 located (e.g., disposed) therebetween as an insulator. As an example, the electrode assembly 10 is formed in a cylindrical shape.

A core pin 14 is located at the center of the cylindrical electrode assembly 10. The core pin 14 is formed in a cylindrical shape such that it serves to maintain the cylindrical shape of the electrode assembly 10.

The positive and the negative electrodes 11 and 12 include coated regions 11a and 12a where an active material is coated on a current collector formed of a thin metal foil, and uncoated regions 11b and 12b where the active material is not coated thereon. A positive electrode current collecting plate 41 is coupled to the uncoated region 11b of the positive electrode 11, and is located above (e.g., at an upper end of) the electrode assembly 10. A negative electrode current collecting plate 42 is coupled to the uncoated region 12b of the negative electrode 12, and is located below (e.g., at a lower end of) the electrode assembly 10 such that it is attached to the bottom of the case 20 by welding.

In the present example embodiment, a configuration in which the positive electrode current collecting plate 41 is located at an upper part (e.g., is located above the electrode assembly 10) and the negative electrode current collecting plate 42 is located at a lower part (e.g., is located below the electrode assembly plate 10) is exemplarily described, but it is not limited thereto, and the positive electrode current collecting plate 41 may be located at the lower part while the negative electrode current collecting plate 42 may be located at the upper part.

The case 20 may be formed in a cylindrical shape or a prismatic shape with one side opened so as to insert the electrode assembly 10 therein.

The case 20 is coupled to the negative electrode current collecting-plate 42 to function as a negative terminal in the rechargeable battery 101, and includes (e.g., is made of) a conductive metal such as aluminum, an aluminum alloy, nickel-plated steel, and/or the like.

After being fitted into the case 20, the cap assembly 140 is fixed to the case 20 by a clamping process, and a beading portion 21 and a clamping portion 22 are formed in the case 20 at that moment.

Figure 2:
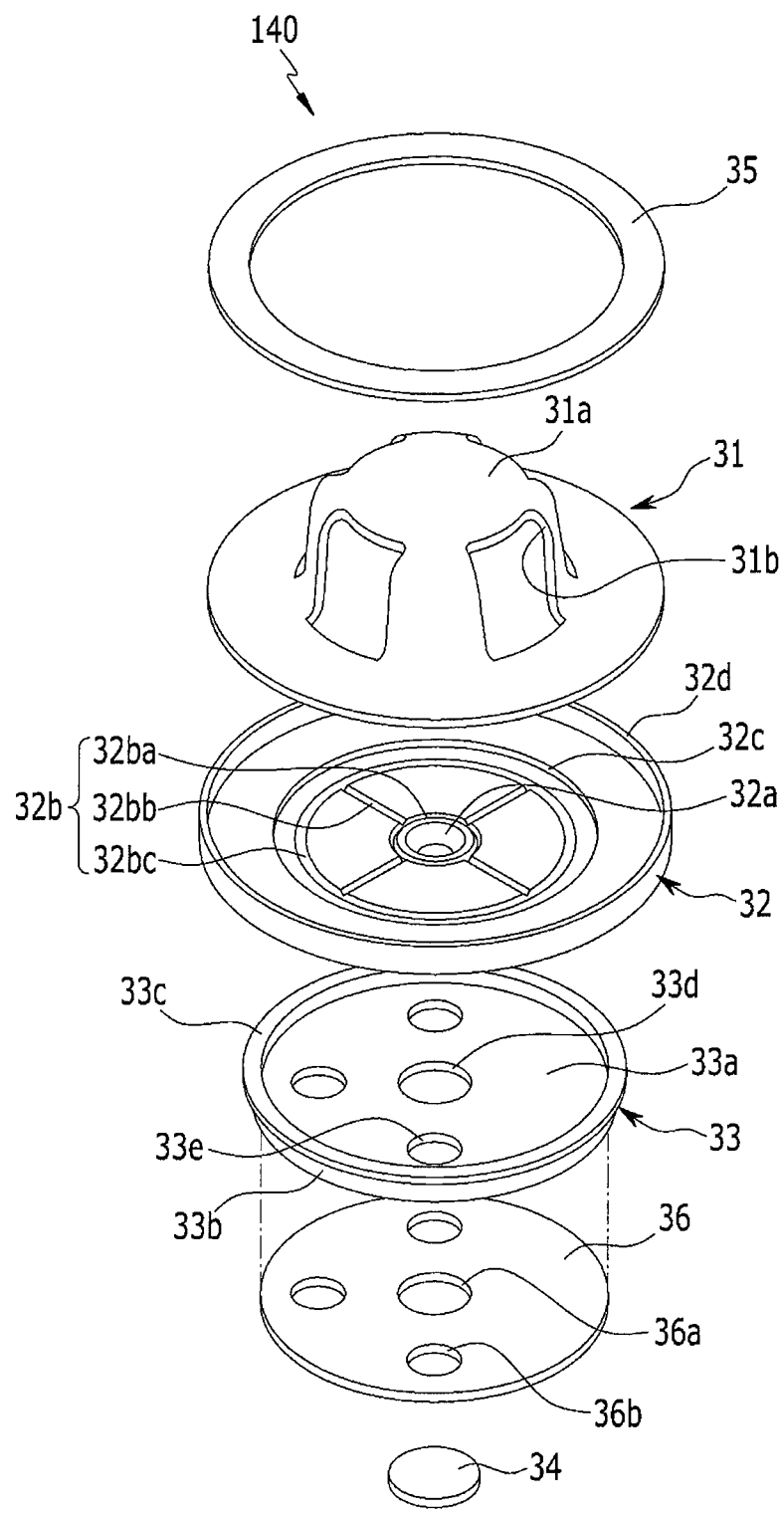
FIG. 2 is an exploded perspective view of a cap assembly, according to the first example embodiment of the present invention.
Figure 3:
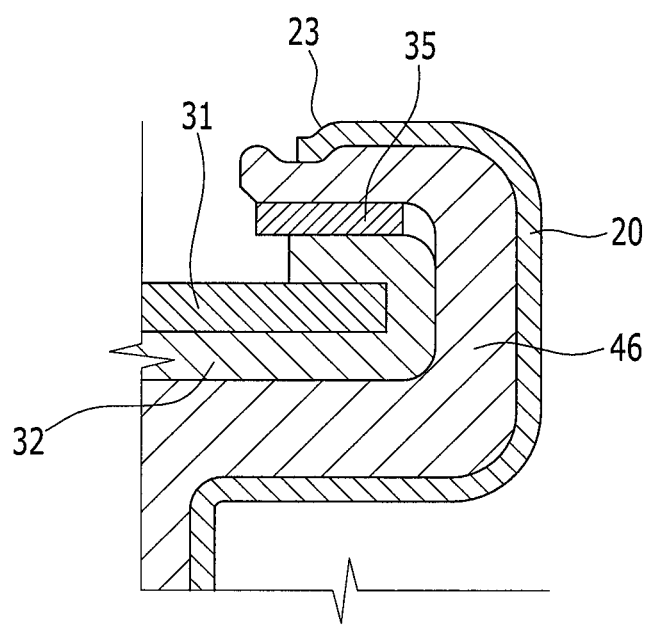
FIG. 3 is a partial cross-sectional view of the cap assembly, according to the first example embodiment of the present invention.

FIG. 2 is an exploded perspective view of the cap assembly 140, according to the first example embodiment of the present invention, and FIG. 3 is a partial cross-sectional view of the cap assembly according to the first example embodiment of the present invention.

Referring to FIGS. 2 and 3, in order to close and seal the case 20 in which the electrode assembly 10 and an electrolyte solution are placed, the cap assembly 140, according to the first example embodiment of the present invention, is combined with (e.g., coupled to or fitted into) an open side of the case 20 by spirally winding a gasket 46.

The cap assembly 140 includes a cap plate 31, a vent plate 32, a sub-plate 34, a heat-resistant member 35, and a middle plate 36. The cap plate 31 is formed in a plate shape that is formed with an upwardly protruding outer terminal 31a and an exhaust hole 31b. Thus, the cap plate 31 is electrically coupled to the positive current collecting plate 41 to function as a positive terminal in the rechargeable battery 101.

The vent plate 32 is located under the cap plate 31, and serves to electrically disconnect the electrode assembly 10 from the cap plate 31 under a predetermined pressure condition. Further, the vent plate 32 may be ruptured under the predetermined pressure condition so as to discharge internal gas of the rechargeable battery 101. To this end, the vent plate 32 is provided with a stepped portion 32c protruding downwards, a connection protrusion 32a downwardly protruding from a center of the stepped portion 32c toward the sub-plate 34, and a notch 32b formed around the connection protrusion 32a.

The notch 32b may be formed in various shapes such that it is ruptured as internal pressure of the rechargeable battery 101 is increased. The notch 32b, according to the present example embodiment of the present invention, includes an inner circle notch 32ba formed around the connection protrusion 32a, a radial notch 32bb radially extending from the inner circle notch 32ba, and an outer circle notch 32bc coupled to outmost ends of the radial notch 32bb.

Further, a supporting portion 32d is provided at a side end of the vent plate 32 such that it protrudes toward the cap plate 31 to enclose an outer circumference thereof.

While being fitted into the cap plate 31, the supporting portion 32d is bent to enclose the outer circumference and an upper-surface edge portion of the cap plate 31. The edge portion refers to a continuous region that extends inwardly from the side end of the cap plate 31 and is adjacent thereto.

A current interrupt device (CID) is formed by the vent plate 32 and the sub-plate 34, and a connecting portion of the sub-plate 34 is formed by the connection protrusion 32a and a welding part of the sub-plate 34. While the current interrupt device (CID) is in operation, the connection protrusion 32a is separated from the sub-plate 34 as it moves up such that the electrode assembly 10 is electrically separated from the cap plate 32.

Further, once the connection protrusion 32a is moved up, if the internal pressure of the rechargeable battery 101 is further increased, the notch 32b is ruptured to discharge the internal gas of the rechargeable battery 101 through the exhaust hole 31b.

The sub-plate 34 is formed in a circular plate shape, and faces the vent plate 32 such that it is coupled to the connection protrusion 32a.

Further, the middle plate 36 is located between an insulator 33 and the sub-plate 34.

A through hole 36a through which the connection protrusion 32a is inserted is formed at a center of the middle plate 36, and an outer periphery (e.g., an outer portion) of the through hole 36a is formed along with a plurality of through holes 36b so as to exhaust the internal pressure of the rechargeable battery 101 to the vent plate 32.

A lead member 45 is fixed by welding to the middle plate 36 for electrical connection with the positive electrode current collecting plate 41. The lead member 45 is bonded by welding to both the positive electrode current collecting plate 41 and the middle plate 36 to electrically connect them.

Thus, one side of the middle plate 36 is coupled to the vent plate 32 through the sub-plate 34 and the connection protrusion 32a, while the other side is coupled to the positive electrode current collecting plate 41 through the lead member 45.

Finally, the positive current collecting plate 41 is electrically coupled to the cap plate 31 through the lead member 45, the middle plate 36, the sub-plate 34, and the vent plate 32.

Meanwhile, the insulator 33 is provided between the middle plate 36 and the vent plate 32 for electrical insulation. The insulator 33 includes a base plate 33a, a side wall 33b protruding upwardly and downwardly from a side end of the base plate 33a, and a supporting portion 33c extending outwardly from an upper end of the side wall 33b.

The base plate 33a is formed in a circular plate shape, and a through hole 33d through which the connection protrusion 32a is inserted is formed at a center of the through hole 33d, and a plurality of exhaust holes 33e are formed at an outer periphery of (e.g., an outer portion of) the through hole 33d to deliver (e.g., release) the internal pressure of the rechargeable battery 101 to the vent plate 32.

The through hole 33d is coupled to the through hole 36a formed in (or through) the middle plate 36, and the exhaust holes 33e are coupled to the through holes 36b formed in (or through) the middle plate 36. As such, the connection protrusion 32a may pass through the through holes 33d and 36a so as to contact the sub-plate 34. Further, when the internal pressure of the rechargeable battery 101 is increased, it may be delivered to the vent plate 32 through the through holes 33e and 36b.

The side wall 33b is formed along the entire circumference of the base plate 33a, and protrudes upwardly and downwardly from the base plate 33a. Further, the side wall 33b encloses circumferences of the stepped portion 32c positioned thereon and the middle plate 36 positioned thereunder. The supporting portion 33c contacts a bottom surface of the vent plate 32. Meanwhile, the heat-resistant member 35 is positioned on an outer surface of the cap plate 31 such that it is located between the gasket 46 and the cap plate 31.

The outer surface of the cap plate 31 indicates a surface facing (e.g., directed toward) the outside of the case 20, while an inner surface indicates a surface facing (e.g., directed toward) the inside of the case 20.

In an example, the heat-resistant member 35 is positioned between (e.g., located between) the gasket 46 and the supporting portion 32d of the vent plate 32. The heat-resistant member 35 is located on a surface of the vent plate 32 that encloses the cap plate 31, and an inner end portion of the heat-resistant member 35 protrudes further toward the center of the case 20 than a front end portion 23 thereof. Further, the inner end portion of the heat-resistant member 35 protrudes further toward the center of the case 20 than that of the vent plate 32.

The heat-resistant member 35 includes (e.g., is made of) a material having a higher melting point than the gasket 46 by 50° C. or more. Further, the heat-resistant member 35 includes (e.g., is made of) a material having an electrical insulating property.

In this example, the gasket 46 may include (e.g., be made of) polybutylene terephthalate (PBT), and the heat-resistant member 35 may include (e.g., be made of) a polyimide resin.

The heat-resistant member 35 is formed in a ring shape, and is positioned below the front end portion 23 of the case 20.

While the cap assembly 140 is fastened to the case 120 by clamping, the front end portion 23 of the case 20 is downwardly bent to press the gasket 46.

When overheating due to an overcurrent is generated in the cap assembly 140, the pressed gasket 46 may be melted to cause a short-circuit between the case 20 and the vent plate 32.

However, according to the present example embodiment of the present invention, because the heat-resistant member 35 is located between the gasket 46 and the vent plate 32, the heat-resistant member 35 may stably prevent the short-circuit between the case 20 and the vent plate 32.

Figure 4:
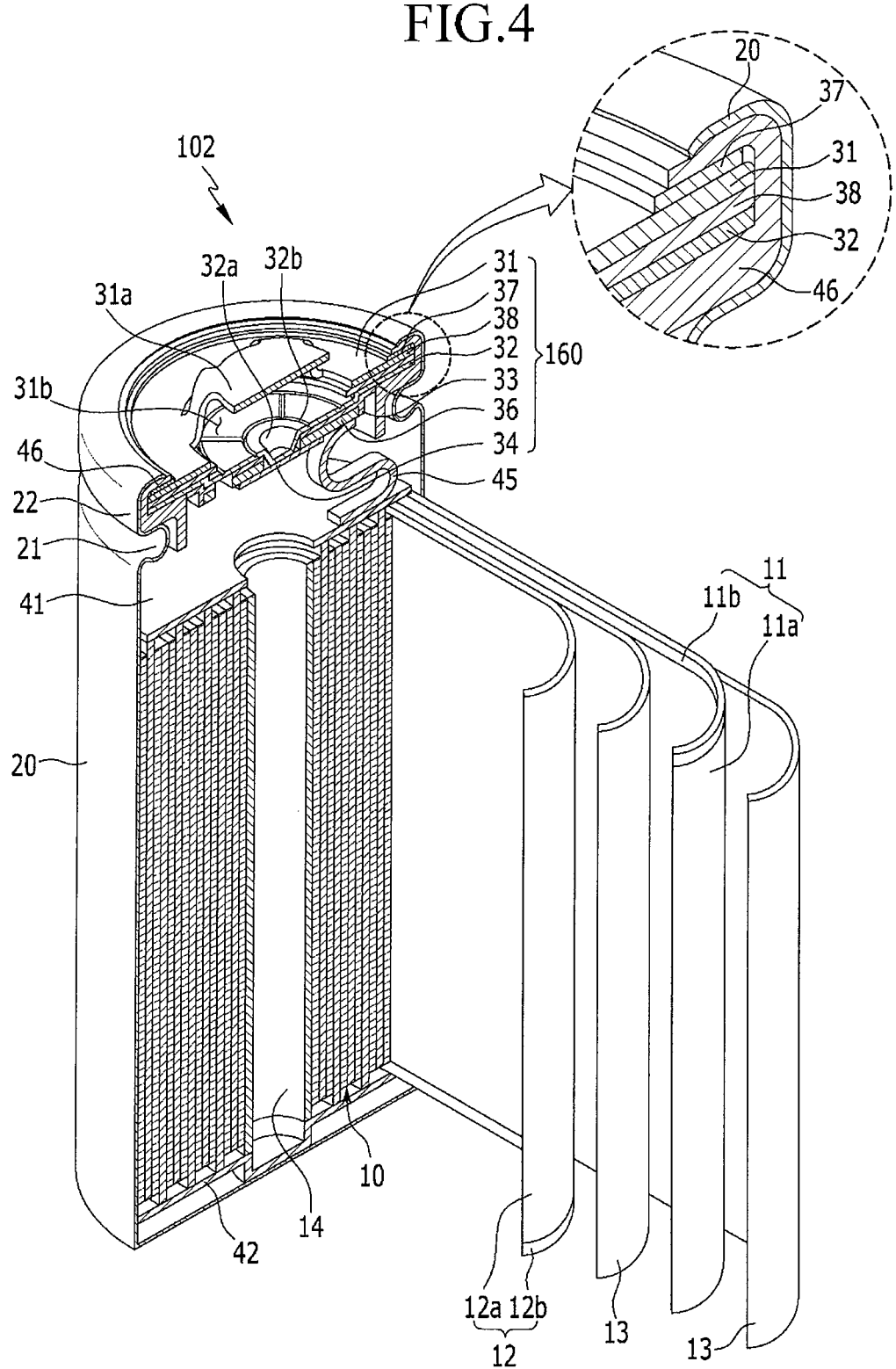
FIG. 4 is a cut-away perspective view of a rechargeable battery, according to a second example embodiment of the present invention.

FIG. 4 is a cut-away perspective view of a rechargeable battery, according to a second example embodiment of the present invention.

Referring to FIG. 4, because the rechargeable battery 102, according to the present example embodiment, has the same structure as the rechargeable battery according to the first example embodiment, except for a vent plate 32 and a positive temperature coefficient (PTC) element, a repeated description of the same structure will not be provided.

A cap assembly 160, according to the present example embodiment, further includes a positive temperature coefficient (PTC) element 38 that is positioned on the vent plate 32. The PTC element 38 is formed in a circular ring shape, and is positioned between the cap plate 31 and the vent plate 32. The PTC element 38, the resistance of which increases as the temperature increases, controls current flow between the cap plate 31 and the vent plate 32. Under a condition exceeding a predetermined temperature, the PTC element 38 has electrical resistance that increases up to infinite, thereby cutting off a charging or discharging current.

The vent plate 32 is not formed with a supporting portion.

Meanwhile, a heat-resistant member 37 is positioned on the outer surface of the cap plate 31, for example, on an edge portion, which is a region adjacent to a side end of the cap plate 31. The heat-resistant member 37 insulates the cap plate 31 from the case 20 between the outer surface of the cap plate 31 and the gasket 46. The heat-resistant member 37 is formed in a ring shape, and protrudes further inwardly toward the case 20 than the gasket 46 and the front end of the case 20. The heat-resistant member 37 may be formed as a film, for example, a film having an adhesive property, such that it is attached to an outer surface of the case 20.

Figure 5:
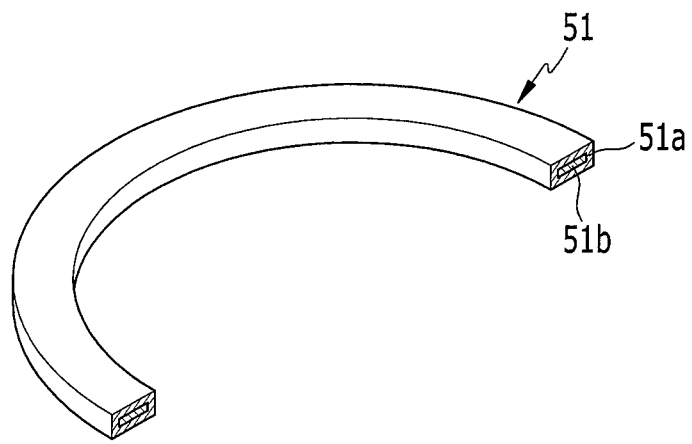
FIG. 5 is a cut-away perspective view of a heat-resistant member of a rechargeable battery, according to a third example embodiment of the present invention.

FIG. 5 is a cut-away perspective view of a heat-resistant member of a rechargeable battery, according to a third example embodiment of the present invention.

Referring to FIG. 5, a heat-resistant member 51, according to the present example embodiment, is formed in a ring shape, and includes an insulating layer 51a and a reinforcing member 51b inserted into the insulating layer 51a.

The insulating layer 51a is provided to enclose the entire reinforcing member 51b. The reinforcing member 51b has greater strength than the insulating layer 51a, and may include (e.g., be made of) a glass fiber fabric or a metal. The glass fiber fabric has a structure in which weft threads and warp threads of glass fibers are weaved. The metal may be aluminum or copper, for example, and may be formed as a metal film. Meanwhile, the insulating layer 51a may include (e.g., be made of) a heat-resistant polymer having a melting point exceeding 300° C., and for example, the insulating layer 51a may include (e.g., be made of) a polyimide (PI).

As in the present example embodiment, if the heat-resistant member 51 includes the reinforcing member 51b and the insulating layer 51a, the heat-resistant member 51 may be prevented from being torn or damaged during a clamping process, thereby providing and improving heat-resistance against high temperature.

For example, if the reinforcing member 51b includes (e.g., is made of) a glass fiber fabric, the heat-resistance and strength of the heat-resistant member 51 may be further improved.

Figure 6:
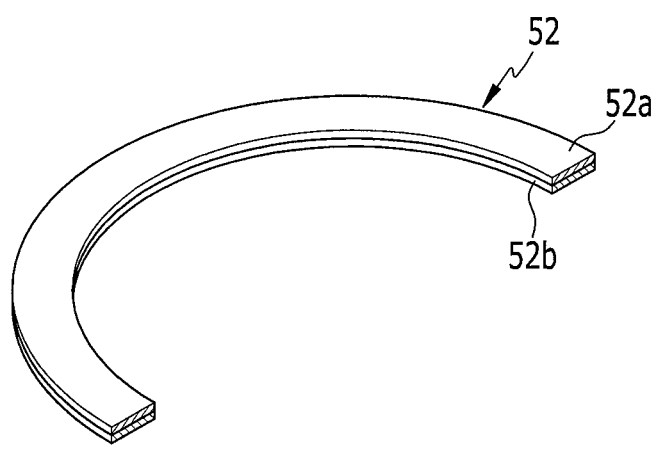
FIG. 6 is a cut-away perspective view of a heat-resistant member of a rechargeable battery according to a fourth example embodiment of the present invention.

FIG. 6 is a cut-away perspective view of a heat-resistant member of a rechargeable battery, according to a fourth example embodiment of the present invention.

Referring to FIG. 6, a heat-resistant member 52, according to the present example embodiment, is formed in a ring shape, and includes a reinforcing member 52b and an insulating layer 52a laminated on the reinforcing member 52b. The reinforcing member 52b has a greater strength than the insulating layer 52a, and may include (e.g., be made of) a glass fiber fabric or a metal. The insulating layer 52a that is laminated on the reinforcing member 52b may include (e.g., be made of) a heat-resistant polymer having a melting point exceeding 300° C. For example, the insulating layer 52a may include (e.g., be made of) a polyimide (PI).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

| Description of Some of the Symbols | |
|---|---|
| 101, 102: rechargeable battery | 10: electrode assembly |
| 11: positive electrode | 12: negative electrode |
| 13: separator | 14: core pin |
| 20: case | 21: beading portion |
| 22: clamping portion | 23: front end portion |
| 31: cap plate | 31a: outer terminal |
| 31b: exhaust hole | 32: vent plate |
| 32a: connection protrusion | 32b: notch |
| 32c: stepped portion | 32d: supporting portion |
| 33: insulator | 33a: base plate |
| 33b: side wall | 33c: supporting portion |
| 33d 36a: through hole | 33e 36b: exhaust hole |
| 34: sub-plate | 35, 37, 51, 52: heat-resistant member |
| 36: middle plate | 38: positive temperature coefficient element |
| 41: positive electrode current collecting plate | |
| 42: negative electrode current collecting plate | |
| 45: lead member | 46: gasket |
| 51a, 52a: insulating layer | 51b, 52b: reinforcing member |
| 140: cap assembly | 160: cap assembly |

What is claimed is:

1. A rechargeable battery comprising:
an electrode assembly comprising a positive electrode and a negative electrode;
a case configured to encase the electrode assembly;
a cap plate coupled to the case and having an inner surface facing the electrode assembly and an outer surface opposite the inner surface;
a gasket between the case and the cap plate and configured to insulate the case from the cap plate, the gasket having a lower portion under the cap plate, an upper portion over the cap plate, and a mid-portion extending from under the cap plate to over the cap plate to connect the lower portion to the upper portion;
a heat-resistant member formed of a material having a higher melting point than the gasket by 50° C. or more and being a ring-shaped disk between an outer surface of the upper portion of the gasket facing the electrode assembly and the outer surface of the cap plate; and
a vent plate having a notch, being under the cap plate, and configured to enclose an edge portion of the cap plate,
wherein the heat-resistant member is between the vent plate and the gasket,
wherein the vent plate has a lower portion under the cap plate, an upper portion over the cap plate, and a mid-portion extending from under the cap plate to over the cap plate to connect the lower portion of the vent plate to the upper portion of the vent plate,
wherein an inner side end of the heat-resistant member protrudes toward a center of the case further than the upper portion of the vent plate, and
wherein the heat-resistant member only contacts the outer surface of the upper portion of the gasket facing the electrode assembly among the surfaces of the gasket.

2. The battery of claim 1, wherein an inner side end of the heat-resistant member protrudes toward a center of the case further than an upper end portion of the case.

3. The battery of claim 1, wherein the heat-resistant member comprises a material having an electrically insulating property.

4. The battery of claim 1, wherein the heat-resistant member comprises a polyimide resin.

5. The battery of claim 1, wherein the heat-resistant member comprises a reinforcing member and an insulating layer configured to enclose the reinforcing member, and wherein the reinforcing member has greater strength than the insulating layer.

6. The battery of claim 5, wherein the reinforcing member comprises a glass fiber fabric.

7. The battery of claim 5, wherein the reinforcing member comprises a metal.

8. The battery of claim 1, wherein the heat-resistant member comprises a reinforcing member and an insulating layer laminated on the reinforcing member, and wherein the reinforcing member has greater strength than the insulating layer.

9. The battery of claim 1, wherein the heat-resistant member comprises a film having an adhesive property and is configured to attach to the case.

10. The battery of claim 1, wherein the heat-resistant member directly contacts the vent plate.

* * * * *